Figure 2:
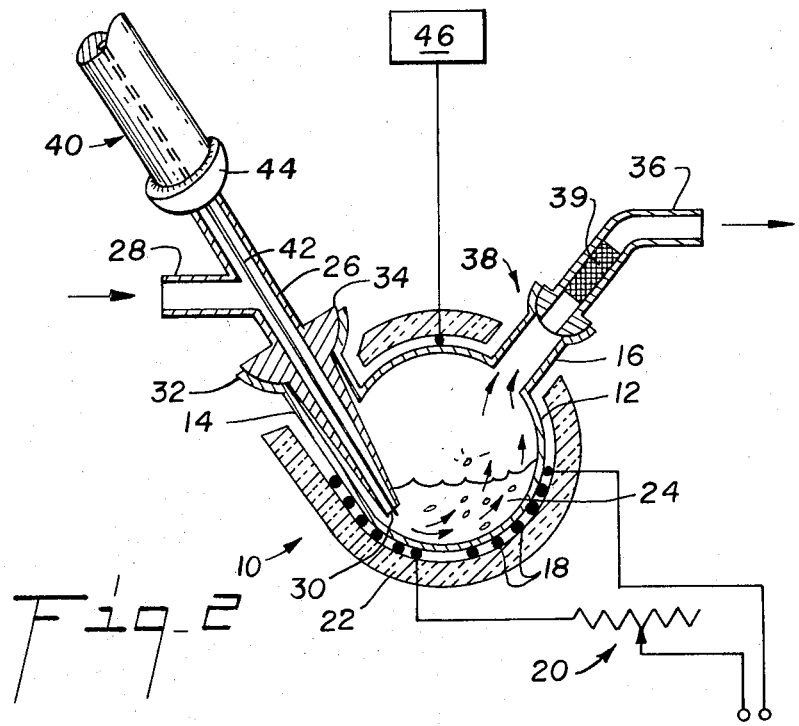

United States Patent [19]

Hiser et al.

[11] 3,773,469
[45] Nov. 20, 1973

[54] METHOD AND APPARATUS FOR DETERMINING THE AMOUNT OF CERTAIN COMPONENTS IN A SUBSTANCE, SUCH AS INORGANIC CARBON AND THE LIKE

[75] Inventors: Lelend L. Hiser; Clarence A. Boldt, Jr.; David S. Tarazi; Oscar Saenz, Jr., all of San Antonio, Tex.

[73] Assignee: Southwest Research Institute, San Antonio, Tex.

[22] Filed: June 28, 1971

[21] Appl. No.: 157,451

[52] U.S. Cl. .................................. 23/253 R, 23/292
[51] Int. Cl. ............................................. G01n 33/18
[58] Field of Search ...................... 23/230 R, 253 R, 23/259, 292, 230 PC; 250/43.5

[56] References Cited
UNITED STATES PATENTS
3,249,403   5/1966   Bochinski et al. ................. 23/253 R Primary Examiner—Robert M. Reese
Attorney—W. F. Hyer et al.

[57] ABSTRACT

A carrier gas is bubbled at a constant rate through a pool of liquid reagent in a reactor to strip the pool of any gases formed therein. The carrier gas is introduced into the liquid below its surface to keep the liquid well mixed. A sample of the substance containing the component, the amount of which is to be determined, is injected into the reagent pool through the inlet of the carrier gas which diffuses the sample quickly throughout the liquid. The reagent and the sample react and produce a gas having the component as a constituent. The gas so produced and the carrier gas are passed through a device that can determine quantitatively the amount of the component in the gas.

6 Claims, 2 Drawing Figures

LELAND L. HISER
CLARENCE A. BOLDT, JR.
DAVID S. TARAZI
OSCAR SAENZ, JR
INVENTORS

BY Hyer, Eickenroht,
Thompson + Turner

ATTORNEYS

METHOD AND APPARATUS FOR DETERMINING THE AMOUNT OF CERTAIN COMPONENTS IN A SUBSTANCE, SUCH AS INORGANIC CARBON AND THE LIKE

This invention relates to a method of and apparatus for determining the amount of a certain component in a substance, such as the inorganic carbon content of an aqueous solution.

This invention can be used to determine the amount of various components in a substance. It will be discussed and described below, however, in connection with the determination of the total inorganic carbon in a substance.

Carbon analysis has become an important tool in defining microbiological processes, which is a very important process that occurs in waste disposal and hopefully can be used in the fight to reduce the pollution of our streams, lakes, and oceans by wastewater. Since the primary concern of all biological systems is the conversion of carbon from one form to another, carbon is one of the major parameters for use in defining the food chain of such systems. Therefore, it is important to have available a device that will provide a rapid analysis of this parameter for use in the development of new design, monitoring, and control criteria for water treating systems. Recently, instruments have been developed that can measure, within a few minutes, the total organic and inorganic carbon content of aqueous solutions. A method and apparatus for determining the total carbon in an aqueous system is described in U. S. Pat. No. 3,296,435, filed July 6, 1964. A method and apparatus for determining the total inorganic carbon content in a liquid is described in U.S. Pat. No. 3,459,938, which issued Aug. 5, 1969. The determination of these two values allows the third unknown, the amount of organic carbon, to be calculated.

In the system of U.S. Pat. No. 3,459,938 for determining inorganic carbon content, a reactor is filled with quartz chips that are coated with phosphoric acid. The reactor operates at a temperature somewhat above 100° C. but below that temperature at which the organic carbon in the sample being tested would be affected by the heat. A sample of the substance being tested is injected into the reactor onto the phosphoric acid coated chips, where the inorganic compounds in the sample react with the phosphoric acid to produce carbon dioxide. A carrier gas is blown through the reactor to carry the carbon dioxide from the reactor to an infrared detector for carbon dioxide. The response of this detector to the organic carbon carried by the carrier gas from the reactor is negligible.

In use, the inorganic carbon determining system described above produces inconsistent results when sequential analyses of samples are made. It is believed that one of the problems is that the system is probably diffusion limited in either the replacement of the spent acid or the transfer of heat to the reaction zone, or both.

Therefore, it is an object of this invention to provide an improved method of and apparatus for determining the amount of a given component in a substance that produces consistent results even when sequential analyses are performed.

It is another object of this invention to provide an improved reactor for use in determining the amount of a given component there is in a substance, for example, the inorganic carbon content, that is not diffusion limited in either the replacement of the reactant or the transfer of heat to the reaction zone, or both.

It is another object of this invention to provide a method of and apparatus for determining the amount of a component there is in a substance wherein the sample of the substance is introduced into a pool of reagent that is continuously stripped by a carrier gas discharged below the surface of the pool to keep the reagent in a turbulent state to insure good diffusion of the sample throughout the reagent.

It is a further object of this invention to provide a reactor for such a system that contains a pool of reagent that will act as a heat sink and hold the temperature of the reactor at or close to the desired process temperature even though successive samples are processed through the apparatus, thereby insuring that the results produced are uniform and eliminating any need to wait between the injection of samples for the reactor to come back to test temperature.

It is another object of this invention to provide such a method and apparatus wherein the sample is injected into a pool of reagent through the conduit of the carrier gas so the carrier gas will tend to keep the sample below a temperature where volatile components in the sample may break out of solution and interfere with the proper injection of the sample into the reagent.

It is another object of this invention to provide a reactor for use in determining the inorganic carbon content of a substance, either gaseous or liquid, that directs the carrier gas into a pool of carbonate reactive acid in the reactor to maintain the pool thoroughly mixed, into which the sample can be injected below the surface of the pool to be quickly diffused therein and reacted to produce carbon dioxide that is stripped from the pool by the carrier gas and carried to the detecting apparatus.

These and other objects, advantages, and features of the invention will be apparent to those skilled in the art from a consideration of this specification, including the attached drawings and appended claims.

Figure 1:
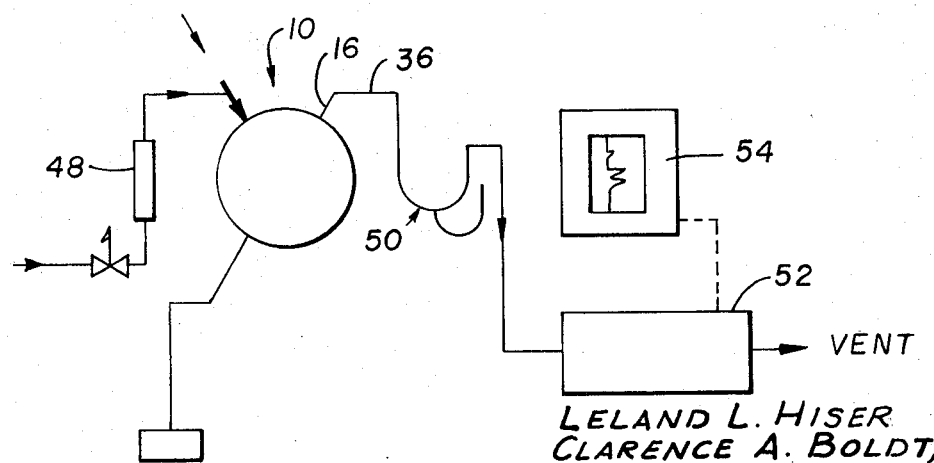

In the drawings:

FIG. 1 is a schematic flow diagram of a total inorganic carbon analyzer adapted to practice the method of this invention and to employ the apparatus of this invention; and FIG. 2 is a sectional view through the preferred embodiment of the reactor used in the system shown in FIG. 1.

The reactor of FIG. 2 includes spherical vessel 12 with inlet 14 and outlet 16. Heating means are provided to heat the reactor. In the embodiment shown, electrical coils 18 are arranged around the lower surface of vessel 12 for this purpose. The heating coils are connected to a source of electrical energy and the heat output of the coils is controlled by variable resistor 20. To reduce the heat required to maintain the reactor at the proper temperature, it is enclosed as completely as possible by layer 22 of insulation.

The reagent to be used in the reactor is placed therein as pool 24 having a surface level such that carrier gas and the sample can be injected into the reagent pool below its surface, in a manner to be described below. As shown, the pool or reagent comes up close to midway of the sides of the reactor vessel 12. The reagent used will depend upon the component to be measured. In the case of determining the total inorganic carbon content of a sample, the reagent is preferably a liquid carbonate-reactive acid, such as phosphoric acid.

Conduit means are provided to conduct a stream of carrier gas into the reactor and discharge the carrier gas into the reagent pool below its surface so that the carrier gas will sweep through the reagent pool carrying any gaseous substances formed therein out of the pool and also creating turbulence in the pool to keep the unspent portion of the reagent well diffused throughout the pool. In the embodiment shown, such carrier gas conduit means includes elongated conduit 26 that extends through inlet 14 of the reactor vessel with its outlet 30 located below the surface of the reagent pool. Conduit 28 is connected to conduit 26 between its ends to conduct carrier gas from a source (not shown) to conduit 26 from which the carrier gas is discharged into the reagent pool. Inlet 14 of vessel 12 has spherically-shaped socket 32 that mates with spherically-shaped portion 34 on conduit 26 to form a ball socket connection between the conduit 26 and the inlet to the reactor. Preferably, this is a ground glass joint that will also maintain a seal between the inlet and the carrier gas conduit as well as permit some relative rotation or movement of the members.

The carrier gas, after it bubbles or sweeps through reagent pool 24, leaves vessel 12 through outlet 16 and conduit 36. A ball and socket type ground glass joint, generally indicated by number 38, is provided between the conduit and outlet 16 to allow some movement of the conduit relative to the reactor while maintaining a seal between the conduit and the reactor.

Filter 39 is positioned in conduit 36 to trap any liquids that may be entrained in the carrier gas as it leaves the reactor.

Means are provided for injecting a sample of the substance to be analyzed into the reactor below the surface of the reagent pool. In the embodiment shown, syringe 40 is positioned with its needle 42 extending through carrier gas conduit 26 with the outlet of needle 42 extending out of outlet 30 of the carrier gas conduit below the surface of the pool of reagent in the reactor. Syringe seal 44 maintains a pressure-tight seal between the carrier gas conduit and the syringe so that carrier gas cannot escape, while the sample is being injected into the reactor. By operating the syringe the predetermined amount of the substance containing the component to be determined is injected into the reactor. Immediately thereafter the syringe can be removed and the open end of conduit 26 closed with a plug (not shown) so that the carrier gas will continue to flow into the reactor to strip the reactor of the gaseous products produced by the reaction between the sample injected therein and the reagent.

Referring now to FIG. 1, in the practice of this method, reactor 10 is raised to the desired temperature for the reaction involved. In the case of determining total inorganic carbon in a sample, the reactor would be at some temperature above about 100° C., but below that at which any organic carbon compounds in the sample would be decomposed so that only the inorganic compounds in the substance being tested will be reacted and broken down by the reagent. The temperature of the reactor is monitored by pyrometer 46 (FIG. 2). When the reagent is at the proper temperature, the carrier gas, which in the case of inorganic carbon determination would either be substantially free of carbon dioxide or have a known quantity of carbon dioxide in it, is passed through the reactor. The flow rate of the carrier gas is preferably maintained at a constant rate. This is monitored by flow meter 48.

A sample is then injected into the reagent below its surface by syringe 40. The reagent reacts with the component the amount of which is being determined to produce a gas having the component as a constituent. This would be carbon dioxide in inorganic carbon determination. The gas produced is swept from the reagent pool by the carrier gas and upwardly and out of the reactor through outlet 16 and conduit 36. The carrier gas and the gas produced by the reactor is passed first through water trap 50 to remove any liquids that still may be in the gaseous stream after it has passed filter 39, then the gas is conducted to analyzer 52 which measures the amount of the substance and records the results on recorder 54.

From the foregoing, it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the apparatus and method of this invention without departing from the scope thereof, it is to be understood that all matter herein set forth or shown in the accompanying drawings is to be interpreted as illustrative and not in a limiting sense.

The invention having been described, what is claimed is:

1. Apparatus for determining the amount of a given component in a substance comprising carrier gas flow control means for producing a confined, continuous carrier gas stream at a substantially constant rate from a pressurized source of carrier gas, a reactor having an inlet and an outlet and containing a pool of liquid that will react with the component and produce a gas having the component as a constituent, conduit means having an inlet and an outlet and extending through the inlet of the reactor with its inlet connected to the carrier gas flow control means and its outlet positioned to discharge the carrier gas below the surface of the liquid pool to provide continuous mixing of the liquid and to strip the liquid of gases produced therein, sample injecting means extending through the carrier gas conduit means into the pool of liquid in the reactor for injecting a predetermined amount of the substance to be analyzed into the pool of liquid for the component to be gasified to be stripped from the pool by the carrier gas, and conduit means connected to the outlet to conduct the carrier gas passing through the pool and the gasified component stripped from the pool by the carrier gas into means for quantitatively indicating the amount of the component in the gaseous stream.

2. The apparatus of claim 1 further provided with means for heating the pool of liquid.

3. Apparatus for determining the inorganic carbon content of a substance comprising carrier gas flow control means for producing a confined, continuous carrier gas stream at a substantially constant rate from a pressurized source of carrier gas, a reactor having an inlet and an outlet and containing a pool of carbonate-reactive acid, conduit means having an inlet and an outlet and extending through the inlet of the reactor with its inlet connected to the carrier gas flow control means and its outlet positioned to discharge the carrier gas below the surface of the acid pool to provide continuous mixing of the acid and to strip the acid of gases produced therein, sample injecting means extending through the carrier gas conduit means into the pool of acid in the reactor for injecting a predetermined amount of the substance to be analyzed into the pool of acid for the inorganic carbon therein to be converted to carbon dioxide to be stripped from the acid pool by the carrier gas, and conduit means connected to the outlet to conduct the carrier gas passing through the acid pool and the carbon dioxide stripped from the pool by the gas into carbon detection means for quantitatively indicating the carbon dioxide in the gaseous stream.

4. The apparatus of claim 3 further provided with means for heating the acid pool to a temperature above 100° C. and below the decomposition temperature of organic carbon components of the liquid to be analyzed.

5. The apparatus of claim 3 in which the acid pool is phosphoric acid.

6. The apparatus of claim 3 further provided with a filter in the outlet to collect liquid particles entrained in the gas stream leaving the reactor.

* * * * *

PO-1050
(5/69)

UNITED STATES PATENT OFFICE
CERTIFICATE OF CORRECTION

Patent No. 3,773,469          Dated November 20, 1973

Inventor(s) Leland L. Hiser; Clarence A. Boldt, Jr.; David S. Tarazi
Oscar Saenz, Jr.

It is certified that error appears in the above-identified patent and that said Letters Patent are hereby corrected as shown below:

On the cover page, in the portion of the caption entitled "Inventors", change "Lelend" to --Leland--.

Signed and sealed this 9th day of April 1974.

(SEAL)
Attest:

EDWARD M. FLETCHER, JR.          C. MARSHALL DANN
Attesting Officer          Commissioner of Patents